United States Patent
Hoehn et al.

(10) Patent No.: US 10,428,283 B2
(45) Date of Patent: Oct. 1, 2019

(54) REACTOR WITH STRIPPING ZONE

(71) Applicant: UOP LLC, Des Plaines, IL (US)

(72) Inventors: Richard K. Hoehn, Mount Prospect, IL (US); Soumendra Mohan Banerjee, New Delhi (IN); Sudipto Chakraborty, Haryana (IN); Kiran Ladkat, Haryana (IN)

(73) Assignee: UOP LLC, Des Plaines, IL (US)

( * ) Notice: Subject to any disclaimer, the term of this patent is extended or adjusted under 35 U.S.C. 154(b) by 2 days.

(21) Appl. No.: 15/189,753

(22) Filed: Jun. 22, 2016

(65) Prior Publication Data
US 2017/0009152 A1    Jan. 12, 2017

Related U.S. Application Data

(60) Provisional application No. 62/190,091, filed on Jul. 8, 2015.

(51) Int. Cl.
*C10G 45/02* (2006.01)
*C10G 67/02* (2006.01)
*B01J 8/04* (2006.01)

(52) U.S. Cl.
CPC ............. *C10G 67/02* (2013.01); *B01J 8/0453* (2013.01); *B01J 2208/00938* (2013.01); *C10G 2300/202* (2013.01); *C10G 2300/205* (2013.01)

(58) Field of Classification Search
CPC ........ C10G 45/02; C10G 67/02; B01J 8/0453; B01J 2208/00938
See application file for complete search history.

(56) References Cited

U.S. PATENT DOCUMENTS

| | | | | |
|---|---|---|---|---|
| 6,036,844 | A * | 3/2000 | Gupta | C10G 65/00 208/143 |
| 6,514,403 | B1 * | 2/2003 | Louie | C10G 65/12 208/58 |
| 7,001,503 | B1 * | 2/2006 | Koyama | C10G 49/002 208/210 |
| 2013/0045142 | A1 | 2/2013 | Hoehn et al. | |
| 2013/0112596 | A1 | 5/2013 | Ramaseshan et al. | |
| 2014/0377140 | A1 | 12/2014 | Zimmerman et al. | |

FOREIGN PATENT DOCUMENTS

| | | |
|---|---|---|
| WO | 2005047433 A1 | 5/2005 |
| WO | 2007039047 A1 | 4/2007 |

OTHER PUBLICATIONS

Nava, "In-situ stripping of H2S in gasoil hydrodesulphurization: Reactor Design Considerations," Chemical Engineering Research and Design, v 82, n. 2 A, p. 208-214, Feb. 2004.

* cited by examiner

*Primary Examiner* — Randy Boyer
(74) *Attorney, Agent, or Firm* — Paschall & Maas Law Office; James C. Paschall

(57) ABSTRACT

A hydrotreating reactor including a vessel comprising an upper zone, and intermediate zone and a lower zone. The upper zone comprises at least one upper catalyst bed. The intermediate zone comprises a vapor/liquid separation zone, wherein gas separated within the vapor/liquid separation zone is directed to a high pressure knockout drum and the liquid separated within the vapor/liquid separation zone is directed to a stripping section and then the lower zone. The lower zone comprises at least one lower catalyst bed. Preferably, the stripping section is configured and arranged for removing hydrogen sulfide and ammonia from the gas.

11 Claims, 1 Drawing Sheet

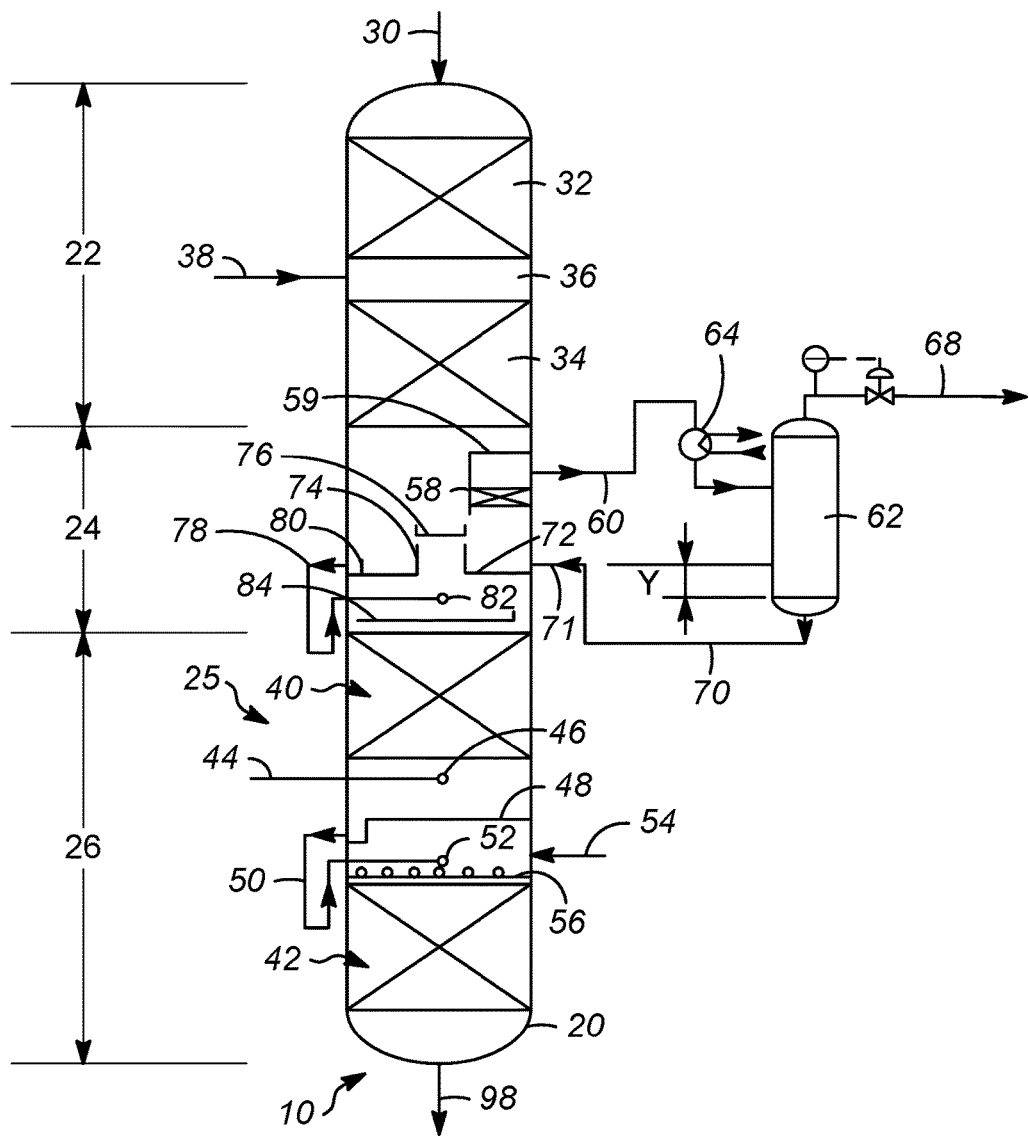

REACTOR WITH STRIPPING ZONE

CROSS-REFERENCE TO RELATED APPLICATION

This application claims priority from Provisional Application No. 62/190,091 filed Jul. 8, 2015, the contents of which are hereby incorporated by reference.

BACKGROUND OF THE INVENTION

The present invention relates generally to hydrotreating processing units and methods, and more particularly to a hydrotreating processing unit that includes a plurality of catalyst zones, where each catalyst zone includes at least one catalyst bed and further wherein the unit includes a vapor/liquid separation zone between the catalyst zones, where the vapor/liquid separation zone is associated with a stripping section for removing materials, such as hydrogen sulfide and ammonia, between the processing by one or more upper catalyst zones and further processing by one or more lower catalyst zones. The present invention also relates to hydrotreating methods with similar features.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

Hydroprocessing recovery units typically include a stripper for stripping hydroprocessed effluent with a stripping medium such as steam, or preferably hydrogen rich gas, to remove unwanted hydrogen sulfide. The stripped effluent is then heated in a fired heater to fractionation temperature before entering a product fractionation column to recover products such as naphtha, kerosene and diesel.

During the hydrotreating process, hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics.

In hydrotreating units that are configured and arranged for processing feeds that include high nitrogen content (greater than 500 wtppm, or even greater than 1000 wtppm, and possibly up to 5000 wtppm) and high sulfur content (greater than 1 wt %, or even greater than 2 wt %, and possibly up to about 5.5 wt %), the catalyst volumes required are high because the ammonia and the hydrogen sulfide formed during the processing tend to inhibit the catalyst activity. In order to compensate for this, the volume of catalyst is increased and/or the unit is operated at a higher average bed temperature.

Accordingly, there is a need for methods and devices that enable hydrotreating of feeds with high nitrogen and sulfur content, but that allows for reduced volumes of catalyst and/or reduced average bed temperatures compared to current methods and devices.

BRIEF SUMMARY OF THE INVENTION

The present invention relates to processes and apparatuses for more efficiently conducting hydrotreating processing by removing materials formed during hydrotreating such as ammonia and hydrogen sulfide, after the stream is processed by an upper catalyst zone, but before being processed by a lower catalyst zone.

Briefly, the present invention provides a hydrotreating reactor including a vessel comprising an upper zone, an intermediate zone and a lower zone. The upper zone comprises at least one upper catalyst bed. The intermediate zone comprises a vapor/liquid separation zone, wherein gas separated within the vapor/liquid separation zone is directed to another vessel, such as a high pressure knockout drum (or other vapor-liquid separator) and the liquid separated within the vapor/liquid separation zone is directed to the lower zone. The lower zone comprises a stripping section and at least one lower catalyst bed. Preferably, the stripping section is configured and arranged for stripping hydrogen sulfide and ammonia via a stripping medium.

The present invention also provides a hydrotreating process that includes providing a feed stream to a hydrotreating vessel, where the hydrotreating vessel comprises an upper zone, an intermediate zone and a lower zone. The stream is passed though the upper zone of the hydrotreating vessel, wherein the upper zone includes at least one upper catalyst bed. The process also includes separating the gas from the liquid within the intermediate zone, and passing the separated gas through a heat exchanger and a separator, such as a high pressure knockout drum, and then routing the liquid effluent from the high pressure knockout drum back to intermediate zone of the hydrotreating vessel. Finally, the process includes passing the liquid within the intermediate zone to the lower zone, wherein the lower zone includes at least one lower catalyst bed.

In more detail, the present invention provides a reactor that includes a stripping section below one or more of the initial treating catalyst beds to remove the hydrogen sulfide and ammonia, the majority of which are formed in the initial catalyst beds. The final catalyst bed processes the feed with scrubbed recycle gas in a clean environment so that the catalyst activity is maximized. This results in a smaller catalyst volume and/or more easily achievable product quality.

One important feature of the invention is a vapor/liquid separation zone to enable removal of the gas phase material which contains hydrogen sulfide and ammonia, which gas phase material is passed to a high pressure (HP) knockout drum, or similar separator. The liquid separated within the vapor/liquid separation zone then combines with the liquid from the high pressure HP knockout drum and passes to a stripping zone where it is stripped by a hot clean gas stream. The stripped liquid is then mixed with heated scrubbed recycle gas, and is then processed in the final catalyst bed.

In more detail, the vapor from the upper catalyst bed(s) and stripping gas exiting the stripping zone exit the reactor, are cooled and enter the HP knockout drum. The vapor is withdrawn from the top of the HP knockout drum and is routed through a control valve to the inlet of an effluent air condenser. The liquid flows by gravity to a collection tray above the stripping zone. The HP knockout drum is preferably located sufficiently above the elevation of the collection tray to allow for the liquid to drain by gravity, in preferred embodiments.

BRIEF DESCRIPTION OF THE DRAWING

Preferred embodiments of the present invention are described herein with reference to the drawings wherein:

The FIGURE is a schematic of one example of an embodiment of a hydrotreating unit that includes a vapor/ liquid separation zone between catalyst zones, and that also includes a stripping section associated with the vapor/liquid separation zone.

DETAILED DESCRIPTION OF THE INVENTION

One example of an embodiment of the present invention is shown in the FIGURE, which depicts a hydrotreating unit 10 that includes a vessel 20 that can be considered as being divided into an upper zone 22, an intermediate zone 24, and a lower zone 26, where the intermediate zone 24 is located between the upper and lower zones. As explained in more detail below, the upper zone 22 includes one or more catalyst beds and thus can be referred to as a "first catalyst zone" or "upper catalyst zone," the intermediate zone 24 is configured and arranged as a vapor/liquid separation zone and is associated with a stripping section, and the lower zone 26 includes one or more catalyst beds and thus can be referred to as a "second catalyst zone" or "lower catalyst zone." One of the features of the present invention is that a single vessel 20 can be configured to include a vapor/liquid separation zone between upper and lower catalyst zones. With such a configuration, the amount of plot space required for the unit is minimal.

Suitable hydrotreating catalysts for use in the present invention are any known conventional hydrotreating catalysts, and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, base metal catalysts (including chromium, nickel and copper, and their ceramic oxides), as well as noble metal catalysts where the noble metal is selected from palladium and platinum. It is within the scope of the present invention that more than one type of hydrotreating catalyst be used in the same hydrotreating unit 10, that different catalysts can be used in the first and second catalyst zones, and that different, or the same, catalysts can be used in different beds within a single catalyst zone. The Group VIII metal is typically present in an amount ranging from about 2 to about 20 wt-%, preferably from about 4 to about 12 wt-%. The Group VI metal will typically be present in an amount ranging from about 1 to about 25 wt-%, preferably from about 2 to about 25 wt-%.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig), preferably 4.1 MPa (gauge) (600 psig) to about 20.6 MPa (gauge) (3000 psig), suitably 12.4 MPa (gauge) (1800 psig), preferably 6.9 MPa (gauge) (1000 psig), a liquid hourly space velocity of the fresh hydrocarbonaceous feedstock from about 0.1 $hr^{-1}$, suitably 0.5 $hr^{-1}$, to about 4 $hr^{-1}$, preferably from about 1.5 to about 3.5 $hr^{-1}$, and a hydrogen rate of about 168 $Nm^3/m^3$ (1,000 scf/bbl), to about 1,011 $Nm^3/m^3$ oil (6,000 scf/bbl), preferably about 168 $Nm^3/m^3$ oil (1,000 scf/bbl) to about 674 $Nm^3/m^3$ oil (4,000 scf/bbl), with a hydrotreating catalyst or a combination of hydrotreating catalysts.

As can be seen in the FIGURE, the feed stream, which includes hydrocarbons and hydrogen, and which may also include recycle gas and/or other added streams, enters upper zone 22 of the vessel 20 through feed line 30. As an alternative to including hydrogen in the feed stream, hydrogen may be provided via a separate inlet (not shown). The feed stream passed through feed line 30 may include high levels of nitrogen and sulfur (such as between 500-5000 wtppm of nitrogen and between about 1-5.5 wt % of sulfur). Illustrative hydrocarbonaceous feed stocks for the feed stream include hydrocarbonaceous streams having components boiling above about 288° C. (550° F.), such as atmospheric gas oils, vacuum gas oil (VGO), vacuum, and atmospheric residue, coker distillates, straight run distillates, solvent-deasphalted oils, pyrolysis-derived oils, high boiling synthetic oils, cycle oils, hydrocracked feeds, cat cracker distillates and the like. A suitable hydrocarbonaceous feedstock is a VGO or other hydrocarbon fraction having at least 50 percent by weight, and usually at least 75 percent by weight, of its components boiling at a temperature above about 399° C. (750° F.). A typical VGO normally has a boiling point range between about 315° C. (600° F.) and about 565° C. (1050° F.).

The upper zone 22 of the vessel 20 includes at least one catalyst bed 32, and may include one or more additional catalyst bed(s) 34, with only one additional catalyst bed 34 being shown. If there is more than one catalyst bed, a quench zone 36 may be provided between adjacent beds. The quench zone 36 may be provided with a quench gas, such as hydrogen, or quench liquid, such as hydrocarbon feed, through quench line 38. While in the upper zone 22 of the vessel 20, heteroatoms, such as sulfur and nitrogen are removed from the stream, resulting in the formation of hydrogen sulfide and ammonia within a gas.

The lower zone 26 of the vessel 20 preferably includes a packed section 40, which includes one or more packed beds that perform the main stripping action of a stripping section (described later) wherein the liquid is contacted in counter current fashion to remove impurities. The lower zone 26 also includes at least one lower catalyst bed 42. Catalyst in the lower catalyst bed 42 may be different from that of the upper beds 32/34. For example catalysts more sensitive and easily deactivated by the presence of ammonia or hydrogen sulfide can be utilized in lower catalyst bed 42, because these impurities have been largely removed in stripping section 25 and by the packed section 40. Specifically, the catalyst in the upper zone 22 may comprise metal guard catalysts and/or low or moderate activity base metal catalysts comprised of cobalt and/or nickel promotor with molybdenum as active catalyst, such as any of the following catalysts manufactured by the Albemarle Corporation of Baton Rouge, La.: KF 647, KF 757, KF 851 or KF 861; and the catalyst in the lower zone 26 may comprise any high activity base metal catalyst, super activity bulk metal catalyst or hydrocracking catalyst or noble metal catalyst or dewaxing catalyst, such as any of the following catalysts manufactured by the Albemarle Corporation: KF 868, KF 780, KF 905N, Nebula, or KC2610, as well as AS200 catalysts manufactured by Nissan Chemical America Corp. or HC150 catalyst manufactured by UOP of Des Plaines, Ill.

Additional lower catalyst beds (not shown) may also be provided within the lower zone 26. A stripping gas, such as steam or hydrogen rich gas (which is much preferred) is preferably provided through stripping gas line 44, which has a distributor 46 that is positioned between the packed section 40 and the catalyst bed 42. A blind tray 48 is provided below the stripping gas distributor 46 for directing liquid to be sent to the catalyst bed 42 through line 50 via distributor 52. Also, scrubbed recycle gas may be provided via scrubbed recycle gas line 54. In effect, this recycle gas line 54 functions to replace the gas phase that exits the vessel 20 via line 60 (described below). A vapor/liquid distribution tray 56 is provided above the lower catalyst bed 42. After the liquids pass through the lower catalyst bed 42, in which further hydrotreating takes place, the effluent exits the vessel 20 through effluent line 98, and may be further processed in any desired manner.

Turning now to the intermediate zone 24, several important features of the present invention will be described, and a sub-combination of such components and processes will be referred to as stripping section 25, whereby in certain embodiments components such as hydrogen sulfide and ammonia, formed during the hydrotreating within the upper zone 22, are stripped from the stream being processed, prior to further processing within the lower zone 26. Within the intermediate zone 24, vapor that has preferably passed through a mesh blanket 58, or other coalescing medium, is passed through vapor line 60 to a vessel 62, such as a high pressure (HP) knockout drum, or other separator which separates liquid and vapor. By controlling the temperature of the vessel 62, the amount of light material being flashed off, which thereby bypasses the lower catalyst bed 42, can be controlled.

A baffle 59 is preferably provided above mesh blanket 58 to protect the gas that has passed through the mesh blanket 58 from liquid flowing downward from bed 34 above. Preferably, the vapor line 60 passes the vapor through a heat exchanger 64, which cools the vapor and may also form liquid in this stream, prior to passing to vessel 62. The materials stripped during processing within packed section 40, such as hydrogen sulfide and ammonia, pass as a vapor through a vapor chimney 74 and join the vapor exiting from catalyst bed 34 in the vapor line 60. The gas overhead stream from the vessel 62 passes into exit line 68, which line directs this stream to other components for further processing, such as to the inlet of a product condenser (not shown).

The liquid effluent (which liquid was primarily formed due to the cooling within heat exchanger 64) from the bottom of vessel 62 passes through line 70 and passes back into the intermediate zone 24 of the hydrotreating vessel 20 at a point above a collection tray 72. With such a configuration, the composition of the liquid phase in 70 being directed to the collection tray 72 can be controlled, thus minimizing the chance that any heavy materials will bypass the lower catalyst bed 42. The return nozzle 71 from line 70 is preferably located below the outlet of vessel 62, or at an elevation Y, which is at a maximum of about one foot (about 30.5 cm) above the tangent line at the bottom of the vessel 62, so that the flow is created by gravity, thereby eliminating the need for a pump. However, if necessary, a pump (not shown) may be utilized.

Turning again to the intermediate zone 24, the collection tray 72 includes a vapor chimney 74 that is protected by a baffle 76, which allows vapor to flow upward through chimney 74, but prevents liquid from flowing downward into chimney 74. This embodiment also preferably includes a liquid line 78 that directs liquid, after passing over a weir 80, or other flow limiting device, to a position below the collection tray 72 via a distributor 82. To prevent the liquid emitted from the distributor 82 from passing directly to the packed section 40, a distributor tray 84 is preferably provided between the distributor 82 and the packed section 40, which tray 84 regulates the flow of liquid.

As described above, the present invention provides a reactor that includes a stripping section 25 below one or more of the initial treating catalyst beds of an upper zone 22 to remove the hydrogen sulfide and ammonia, the majority of which are formed in the initial catalyst beds. The final catalyst bed of the lower zone 26 processes the feed with scrubbed recycle gas in a clean environment so that the catalyst activity is maximized. This results in a smaller catalyst volume and/or more easily achievable product quality, all within a single vessel that includes a first catalyst zone, a second catalyst zone and a vapor liquid separation zone between the first and second catalyst zones

SPECIFIC EMBODIMENTS

While the following is described in conjunction with specific embodiments, it will be understood that this description is intended to illustrate and not limit the scope of the preceding description and the appended claims.

A first embodiment of the invention is a process comprising providing a feed stream to a hydrotreating vessel, where the hydrotreating vessel comprises an upper zone, an intermediate zone and a lower zone; passing the feed stream though the upper zone of the hydrotreating vessel, wherein the upper zone includes at least one upper catalyst bed; separating the gas from the liquid within the intermediate zone; passing the gas separated within the intermediate zone out of the hydrotreating vessel; and passing the liquid within the intermediate zone to the lower zone, wherein the lower zone includes a packed section wherein the liquid is contacted in counter current fashion to remove impurities, after which the liquid passes to at least one lower catalyst bed wherein the step of removing impurities involves removing hydrogen sulfide and ammonia, and further wherein the hydrogen sulfide and the ammonia are passed out of the hydrotreating vessel during the step of passing the gas separated out of the hydrotreating vessel. An embodiment of the invention is one, any or all of prior embodiments in this paragraph up through the first embodiment in this paragraph, further comprising providing a first catalyst to the at least one upper catalyst bed; and providing a second catalyst to the at least one lower catalyst bed, wherein the first catalyst is different from the second catalyst. An embodiment of the invention is one, any or all of prior embodiments in this paragraph up through the first embodiment in this paragraph, wherein the step of passing the separated gas comprises passing the separated gas through a heat exchanger and separating the vapor and liquid phase in a separator and routing liquid effluent from the separator back to the intermediate zone of the hydrotreating vessel. An embodiment of the invention is one, any or all of prior embodiments in this paragraph up through the first embodiment in this paragraph, wherein the packed section is positioned between the upper and lower catalyst zones. An embodiment of the invention is one, any or all of prior embodiments in this paragraph up through the first embodiment in this paragraph, wherein the routing the liquid effluent from the separator back to the intermediate zone of the hydrotreating vessel is performed without a pump. An embodiment of the invention is one, any or all of prior embodiments in this paragraph up through the first embodiment in this paragraph, wherein the step of passing the liquid within the intermediate zone to the lower zone include the use of a weir.

A second embodiment of the invention is an apparatus comprising an upper zone, an intermediate zone and a lower zone, wherein the upper zone comprises at least one upper catalyst bed; the intermediate zone comprises a vapor/liquid separation zone, wherein the gas separated within the vapor/liquid separation zone is directed to a high pressure knockout drum and the liquid separated within the vapor/liquid separation zone is directed to the lower zone; and the lower zone comprises a stripping section and at least one lower catalyst bed. An embodiment of the invention is one, any or all of prior embodiments in this paragraph up through the second embodiment in this paragraph, wherein the stripping section comprises at least one packed bed positioned between the upper and lower catalyst zones. An embodiment of the invention is one, any or all of prior embodiments in this paragraph up through the second embodiment in this paragraph, wherein the intermediate zone comprises a collection tray for receiving liquid from the high pressure knockout drum, and further wherein liquid collected on the collection tray is passed to a distributor and is then distributed via a distributor tray. An embodiment of the invention is one, any or all of prior embodiments in this paragraph up through the second embodiment in this paragraph, wherein the at least one upper catalyst bed includes a first catalyst; and the at least one lower catalyst bed includes a second catalyst, and further wherein the first catalyst is different from the second catalyst. An embodiment of the invention is one, any or all of prior embodiments in this paragraph up through the second embodiment in this paragraph, wherein the intermediate zone further comprises a heat exchanger, whereby the gas separated within the vapor/liquid separation zone is directed to the heat exchanger prior to passing into the high pressure knockout drum. An embodiment of the invention is one, any or all of prior embodiments in this paragraph up through the second embodiment in this paragraph, wherein the stripping section is configured and arranged for removing hydrogen sulfide and ammonia from the gas. An embodiment of the invention is one, any or all of prior embodiments in this paragraph up through the second embodiment in this paragraph, wherein the upper zone, the vapor/liquid separation zone of the intermediate zone and the lower zone are provided within a single vessel. An embodiment of the invention is one, any or all of prior embodiments in this paragraph up through the second embodiment in this paragraph, further comprising a vapor/liquid distribution tray between the at least one lower catalyst bed and the packing section.

A third embodiment of the invention is a process comprising providing a feed stream to a hydrotreating vessel, where the hydrotreating vessel comprises an upper zone, an intermediate zone and a lower zone; passing the feed stream though the upper zone of the hydrotreating vessel, wherein the upper zone includes at least one upper catalyst bed; separating the gas from the liquid within the intermediate zone; passing the separated gas through a high pressure knockout drum and routing the liquid effluent from the high pressure knockout drum back to the intermediate zone of the hydrotreating vessel; passing the liquid within the intermediate zone to the lower zone, wherein the lower zone includes a stripping section and at least one lower catalyst bed; and providing a stripping gas to the lower zone of the stripping section of the hydrotreating vessel. An embodiment of the invention is one, any or all of prior embodiments in this paragraph up through the third embodiment in this paragraph, wherein the stripping gas is steam or, preferably, a hydrogen rich gas. An embodiment of the invention is one, any or all of prior embodiments in this paragraph up through the third embodiment in this paragraph, further comprising providing a first catalyst to the at least one upper catalyst bed; and providing a second catalyst to the at least one lower catalyst bed, wherein the first catalyst is different from the second catalyst. An embodiment of the invention is one, any or all of prior embodiments in this paragraph up through the third embodiment in this paragraph, wherein the step of passing the gas through the stripping section involves removing hydrogen sulfide and ammonia from the liquid passing to the lower catalyst zones. An embodiment of the invention is one, any or all of prior embodiments in this paragraph up through the third embodiment in this paragraph, wherein the routing the liquid effluent from the high pressure knockout drum back to the intermediate zone of the hydrotreating vessel is performed without a pump. An embodiment of the invention is one, any or all of prior embodiments in this paragraph up through the third embodiment in this paragraph, wherein the routing the liquid effluent from the high pressure knockout drum back to the intermediate zone of the hydrotreating vessel relies upon gravity to propel the liquid effluent.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A hydrotreating process comprising:
providing a feed stream to a hydrotreating vessel, where the hydrotreating vessel comprises an upper zone, an intermediate zone and a lower zone;
passing the feed stream through the upper zone of the hydrotreating vessel, wherein the upper zone includes at least one upper catalyst bed;
separating a gas from a liquid within the intermediate zone;
passing the gas separated within the intermediate zone out of the hydrotreating vessel, said step of passing the separated gas comprises passing the separated gas through a heat exchanger and separating the vapor and liquid phase in a separator and routing liquid effluent from the separator back to said intermediate zone of the hydrotreating vessel;
providing a stripping gas to the lower zone through a first gas line;
replacing gas separated within the intermediate zone in the lower zone with a replacement gas via a second gas line in the lower zone; and
passing the liquid within the intermediate zone to the lower zone, wherein the lower zone includes a packed section wherein the liquid is contacted in counter current fashion with the stripping gas to remove impurities;
passing the liquid through to at least one lower catalyst in the lower zone,
wherein the step of removing impurities involves removing hydrogen sulfide and ammonia; and further wherein the hydrogen sulfide and the ammonia are passed out of the hydrotreating vessel during said step of passing the gas separated out of the hydrotreating vessel.

2. The hydrotreating process according to claim 1, further comprising:
providing a first catalyst to the at least one upper catalyst bed; and
providing a second catalyst to the at least one lower catalyst bed, wherein the first catalyst is different from the second catalyst.

3. The hydrotreating process according to claim 1, wherein the packed section is positioned between the upper and the lower zones.

4. The hydrotreating process according to claim 1, wherein said routing the liquid effluent from the separator back to said intermediate zone of the hydrotreating vessel is performed without a pump.

5. The hydrotreating process according to claim 1, wherein said step of passing the liquid within the intermediate zone to the lower zone includes the use of a weir.

6. A hydrotreating process comprising:
providing a feed stream to a hydrotreating vessel, where the hydrotreating vessel comprises an upper zone, an intermediate zone and a lower zone;
passing the feed stream through the upper zone of the hydrotreating vessel, wherein the upper zone includes at least one upper catalyst bed;
separating a gas from a liquid within the intermediate zone;
passing the separated gas through a heat exchanger and separating the vapor and liquid phase in a separator, and
routing a liquid effluent from the separator back to the intermediate zone of the hydrotreating vessel;
passing the liquid within the intermediate zone to the lower zone, wherein the lower zone includes a stripping section below the intermediate zone and at least one lower catalyst bed; and
providing a stripping gas to the lower zone of the stripping section of the hydrotreating vessel.

7. The hydrotreating process according to claim 6, wherein the stripping gas is steam or a hydrogen rich gas.

8. The hydrotreating process according to claim 6, further comprising:
providing a first catalyst to the at least one upper catalyst bed; and
providing a second catalyst to the at least one lower catalyst bed, wherein the first catalyst is different from the second catalyst.

9. The hydrotreating process according to claim 6, wherein the step of passing the gas through the stripping section involves removing hydrogen sulfide and ammonia from the liquid passing to the lower catalyst zones.

10. The hydrotreating process according to claim 6, wherein said routing the liquid effluent from the separator back to said intermediate zone of the hydrotreating vessel is performed without a pump.

11. The hydrotreating process according to claim 6, wherein said routing the liquid effluent from the separator back to said intermediate zone of the hydrotreating vessel relies upon gravity to propel the liquid effluent.

* * * * *